United States Patent
Garay et al.

(10) Patent No.: US 11,480,058 B2
(45) Date of Patent: Oct. 25, 2022

(54) ENGINE COMPONENT WITH SET OF COOLING HOLES

(71) Applicant: GENERAL ELECTRIC COMPANY, Schenectady, NY (US)

(72) Inventors: Gregory Terrence Garay, West Chester, OH (US); Tingfan Pang, West Chester, OH (US); Helen Ogbazion Gabregiorgish, San Francisco, CA (US); Zachary Daniel Webster, Mason, OH (US); Steven Robert Brassfield, Cincinatti, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/029,807

(22) Filed: Sep. 23, 2020

(65) Prior Publication Data
US 2021/0003020 A1    Jan. 7, 2021

Related U.S. Application Data

(63) Continuation of application No. 15/873,301, filed on Jan. 17, 2018, now abandoned.

(51) Int. Cl.
| | |
|---|---|
| *F01D 5/18* | (2006.01) |
| *F01D 9/02* | (2006.01) |
| *F01D 25/24* | (2006.01) |
| *F01D 25/12* | (2006.01) |
| *F01D 9/06* | (2006.01) |

(52) U.S. Cl.
CPC ............. *F01D 5/187* (2013.01); *F01D 5/186* (2013.01); *F01D 9/02* (2013.01); *F01D 25/12* (2013.01); *F01D 25/24* (2013.01); *F01D 9/065* (2013.01); *F05D 2250/71* (2013.01);
(Continued)

(58) Field of Classification Search
CPC .......... F01D 9/065; F01D 5/186; F01D 5/187; F01D 5/188; F01D 5/189; F05D 2260/20; F05D 2260/202; F05D 2260/2212; F05D 2240/127; F05D 2260/22141
See application file for complete search history.

(56) References Cited

U.S. PATENT DOCUMENTS

| | | |
|---|---|---|
| 4,653,983 A | 3/1987 | Vehr |
| 5,486,093 A | 1/1996 | Auxier et al. |

(Continued)

FOREIGN PATENT DOCUMENTS

| | | |
|---|---|---|
| CN | 1782330 A | 6/2006 |
| CN | 101008327 A | 8/2007 |

(Continued)

*Primary Examiner* — Christopher Verdier
(74) *Attorney, Agent, or Firm* — McGarry Bair PC

(57) ABSTRACT

An apparatus and method an engine component for a turbine engine comprising an outer wall bounding an interior and defining a pressure side and an opposing suction side, with both sides extending between a leading edge and a trailing edge to define a chord-wise direction, and extending between a root and a tip to define a span-wise direction, at least one cooling passage located within the interior, a set of cooling holes having an inlet fluidly coupled to the cooling passage, an outlet located on one of the pressure side or suction side, with a connecting passage fluidly coupling the inlet to the outlet.

19 Claims, 10 Drawing Sheets

(52) U.S. Cl.
CPC .......... *F05D 2260/202* (2013.01); *F05D 2260/2212* (2013.01); *F05D 2260/22141* (2013.01)

(56) References Cited

U.S. PATENT DOCUMENTS

| | | | |
|---|---|---|---|
| 5,688,104 A | 11/1997 | Beabout | |
| 6,164,912 A | 12/2000 | Tabbita et al. | |
| 7,296,967 B2 | 11/2007 | Shapiro | |
| 7,300,252 B2 | 11/2007 | Liang | |
| 7,306,026 B2 | 12/2007 | Memmen | |
| 7,322,795 B2 | 1/2008 | Luczak et al. | |
| 7,374,401 B2 | 5/2008 | Lee | |
| 7,458,778 B1 | 12/2008 | Liang | |
| 7,478,994 B2 | 1/2009 | Cunha et al. | |
| 7,540,712 B1 | 6/2009 | Liang | |
| 7,789,626 B1 | 9/2010 | Liang | |
| 7,798,776 B1 | 9/2010 | Liang | |
| 8,414,263 B1 | 4/2013 | Liang | |
| 8,562,295 B1 | 10/2013 | Liang | |
| 9,103,213 B2 | 8/2015 | Barr et al. | |
| 9,228,440 B2 | 1/2016 | Kollati et al. | |
| 10,408,076 B2 | 9/2019 | Olive et al. | |
| 2002/0172596 A1* | 11/2002 | Kohli | F01D 5/186 416/1 |
| 2009/0304494 A1* | 12/2009 | Strock | F01D 5/186 415/1 |
| 2010/0040478 A1* | 2/2010 | Abdel-Messeh | F01D 5/187 416/97 R |
| 2011/0311369 A1 | 12/2011 | Ramachandran et al. | |
| 2012/0183412 A1 | 7/2012 | Lacy et al. | |
| 2012/0301319 A1* | 11/2012 | Lacy | F01D 5/187 416/97 R |
| 2013/0183166 A1 | 7/2013 | Lacy | |
| 2014/0154096 A1* | 6/2014 | Kollati | F01D 5/186 416/97 R |
| 2016/0010463 A1 | 1/2016 | Quach et al. | |
| 2016/0032416 A1 | 2/2016 | Propheter-Hinckley et al. | |
| 2016/0146017 A1 | 5/2016 | Vogel et al. | |
| 2016/0177734 A1 | 6/2016 | Quach et al. | |
| 2016/0273363 A1 | 9/2016 | Bunker et al. | |
| 2016/0298545 A1 | 10/2016 | Zhang et al. | |
| 2017/0030200 A1* | 2/2017 | Kruckels | F01D 25/12 |
| 2017/0101870 A1* | 4/2017 | Lewis | F01D 5/186 |
| 2017/0138599 A1 | 5/2017 | Baibuzenko et al. | |
| 2019/0153870 A1 | 5/2019 | Garay et al. | |

FOREIGN PATENT DOCUMENTS

| | | |
|---|---|---|
| CN | 103291371 A | 9/2013 |
| CN | 106050317 A | 10/2016 |
| CN | 107075956 A | 8/2017 |
| EP | 0641917 A1 | 3/1995 |
| KR | 20150130872 A | 11/2015 |
| WO | 2015134006 A1 | 9/2015 |

\* cited by examiner

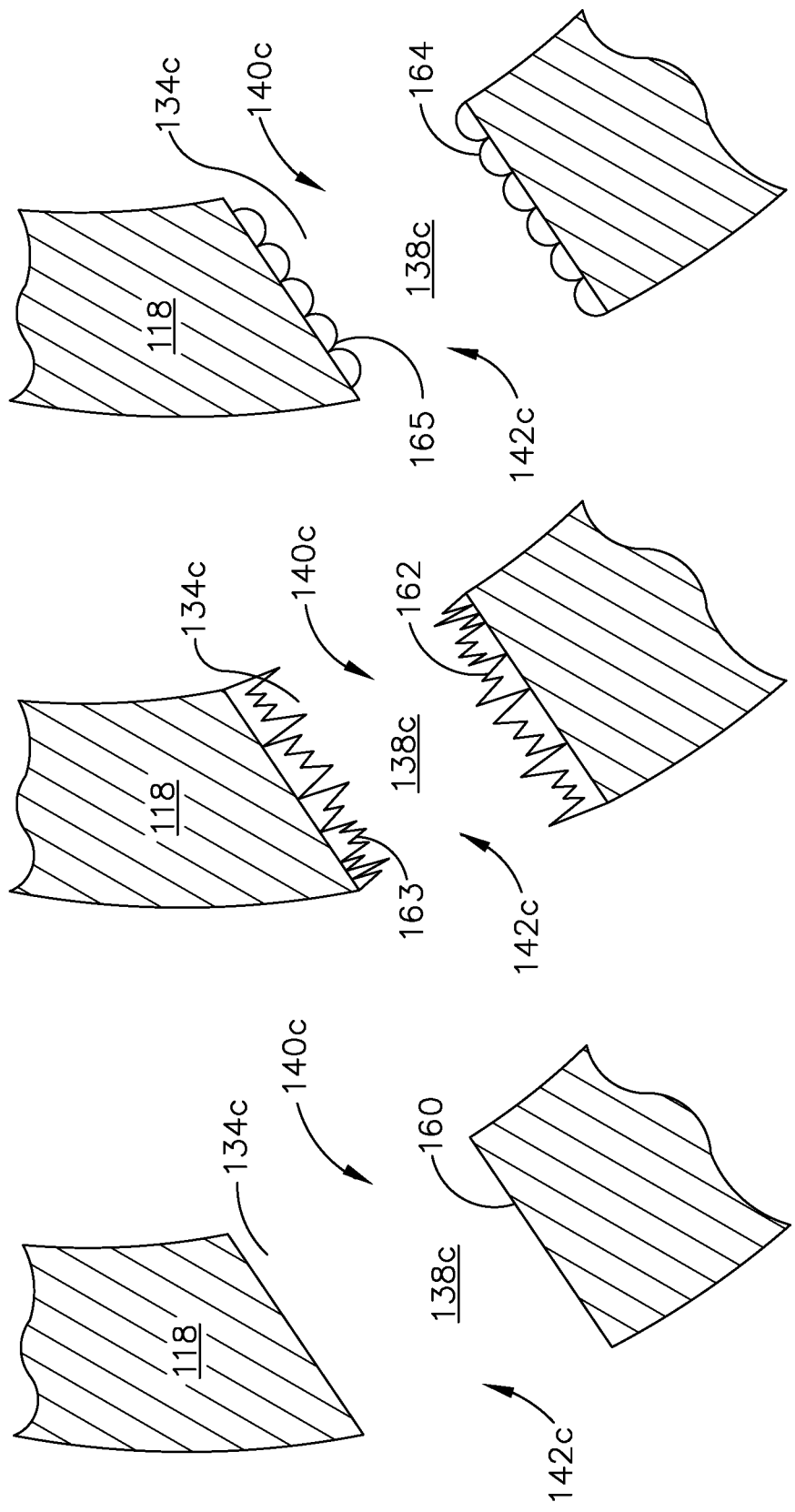

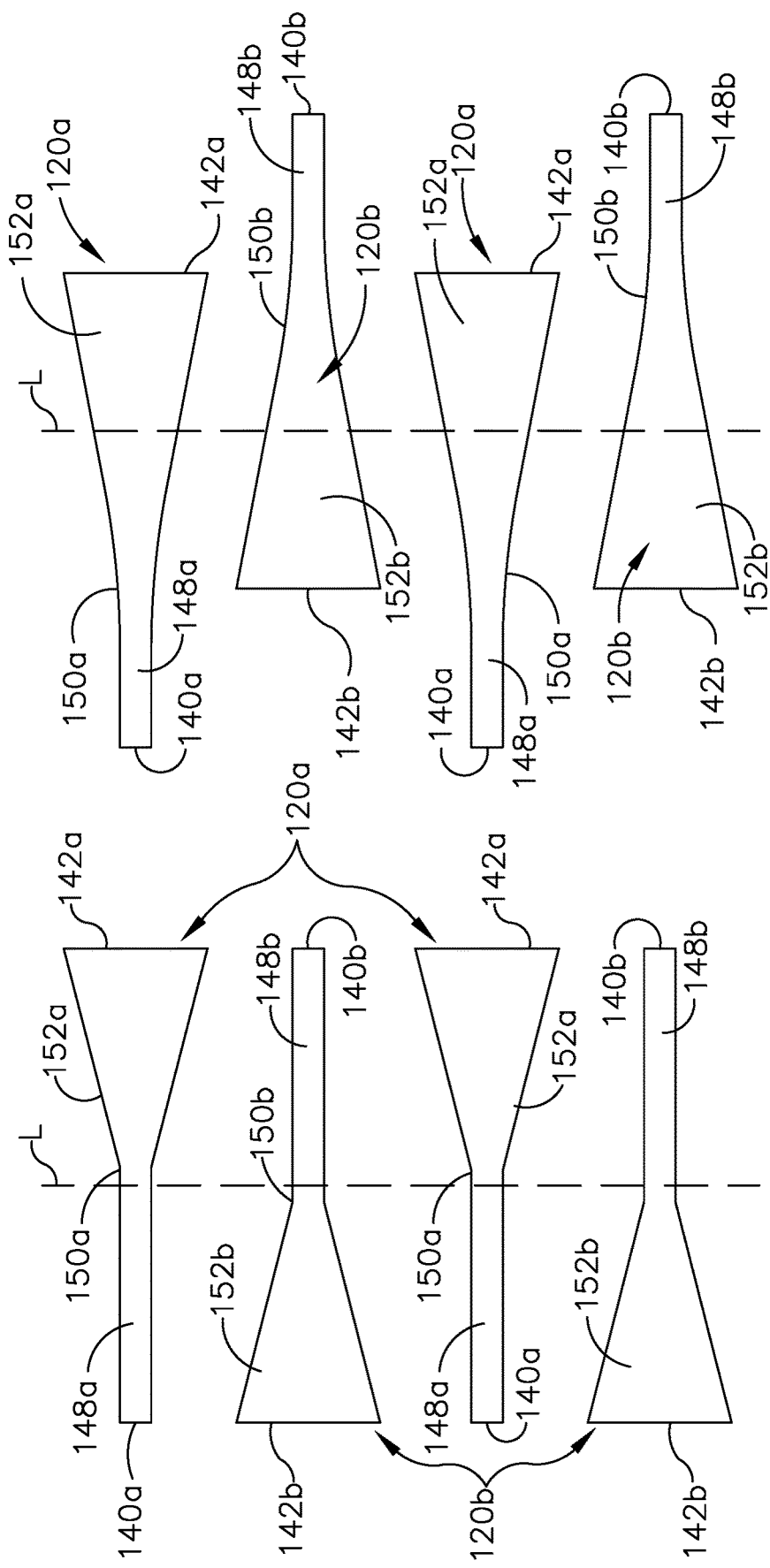

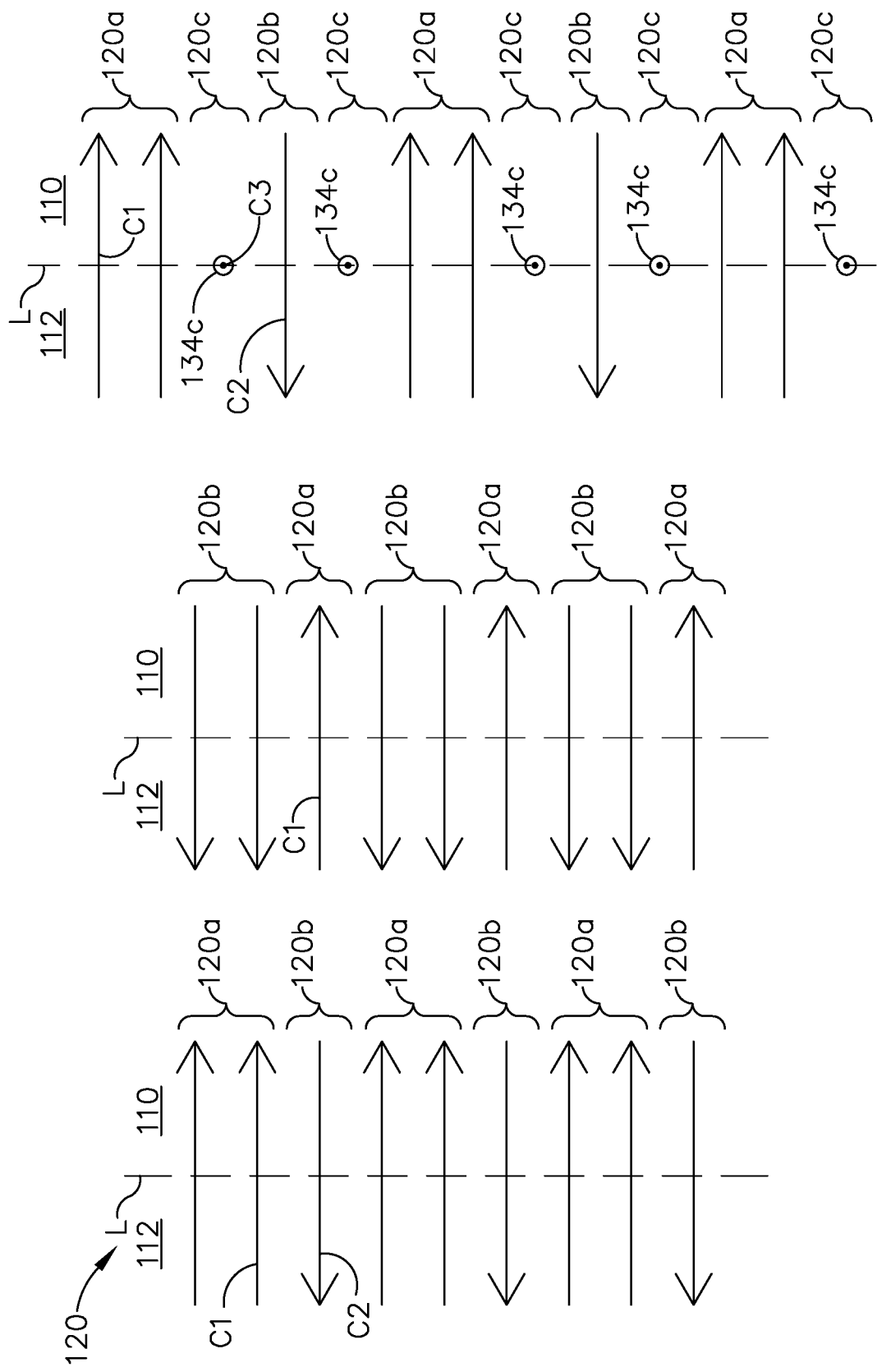

ENGINE COMPONENT WITH SET OF COOLING HOLES

CROSS REFERENCE TO RELATED APPLICATION

This application is a continuation of U.S. patent application Ser. No. 15/873,301 filed Jan. 17, 2018, which is incorporated herein in its entirety.

BACKGROUND OF THE INVENTION

Turbine engines, and particularly gas or combustion turbine engines, are rotary engines that extract energy from a flow of combusted gases passing through the engine onto a multitude of rotating turbine blades.

Turbine blade assemblies include the turbine airfoil, such as a stationary vane or rotating blade, with the blade having a platform and a dovetail mounting portion. The turbine blade assembly includes cooling inlet passages as part of serpentine circuits in the platform and blade used to cool the platform and blade. The serpentine circuits can extend to cooling holes located along any of the multiple surfaces of the blade including at the tip. Nozzles comprising a pair of stationary vanes located between inner and outer bands and combustor liners surrounding the combustor of the engine can also utilize cooling holes and/or serpentine circuits.

BRIEF DESCRIPTION OF THE INVENTION

In one aspect, the present disclosure relates to an airfoil for a turbine engine comprising an outer wall bounding an interior and defining a pressure side and an opposing suction side, with both sides extending between a leading edge and a trailing edge to define a chord-wise direction, and extending between a root and a tip to define a span-wise direction; at least one cooling passage located within the interior; a first set of cooling holes having a first inlet fluidly coupled to the cooling passage, a first outlet located on the pressure side, with a first connecting passage having a curvilinear centerline fluidly coupling the first inlet to the first outlet, and the first connecting passage having a portion extending along the suction side; a second set of cooling holes having a second inlet fluidly coupled to the cooling passage, a second outlet located on the suction side, with a second connecting passage having a curvilinear centerline fluidly coupling the second inlet to the second outlet, and the second connecting passage having a portion extending along the pressure side; and a third set of cooling holes having a third outlet proximate the leading edge of the outer wall.

In another aspect, the present disclosure relates to an engine component for a turbine engine comprising: an outer wall bounding an interior and defining a pressure side and an opposing suction side, with both sides extending between a leading edge and a trailing edge to define a chord-wise direction, and extending between a root and a tip to define a span-wise direction; at least one cooling passage located within the interior; a first set of cooling holes having a first inlet fluidly coupled to the cooling passage, a first outlet located on the pressure side, with a first connecting passage having a curvilinear centerline fluidly coupling the inlet to the outlet, and the first connecting passage having a portion extending along the suction side; a second set of cooling holes having a second inlet fluidly coupled to the cooling passage, a second outlet located on the suction side, with a second connecting passage having a curvilinear centerline fluidly coupling the second inlet to the second outlet, and the second connecting passage having a portion extending along the pressure side; and a third set of cooling holes having a third outlet proximate the leading edge of the outer wall.

BRIEF DESCRIPTION OF THE DRAWINGS

In the drawings:

FIG. 4A is an enlarged view of a cooling hole according to an aspect of the disclosure discussed herein.

FIG. 4B is an enlarged view of a cooling hole according to another aspect of the disclosure herein.

FIG. 4C is an enlarged view of a cooling hole according to yet another aspect of the disclosure herein.

FIG. 5A is a schematic representation of the at least one set of cooling holes as viewed along a leading edge of the turbine blade from FIG. 2 according to an aspect of the disclosure herein.

FIG. 5B is a schematic representation of an alternate at least one set of cooling holes as viewed along a leading edge of the turbine blade from FIG. 2 according to another aspect of the disclosure herein.

FIG. 6A is a schematic representation of an arrangement of the at least one set of cooling holes as viewed along the leading edge of the turbine blade from FIG. 2 according to an aspect of the disclosure herein.

FIG. 6B is a schematic representation of an arrangement of the at least one set of cooling holes as viewed along the leading edge of the turbine blade from FIG. 2 according to another aspect of the disclosure herein.

FIG. 6C is a schematic representation of an arrangement of the at least one set of cooling holes as viewed along the leading edge of the turbine blade from FIG. 2 according to yet another aspect of the disclosure herein.

DETAILED DESCRIPTION OF THE INVENTION

Figure 1:
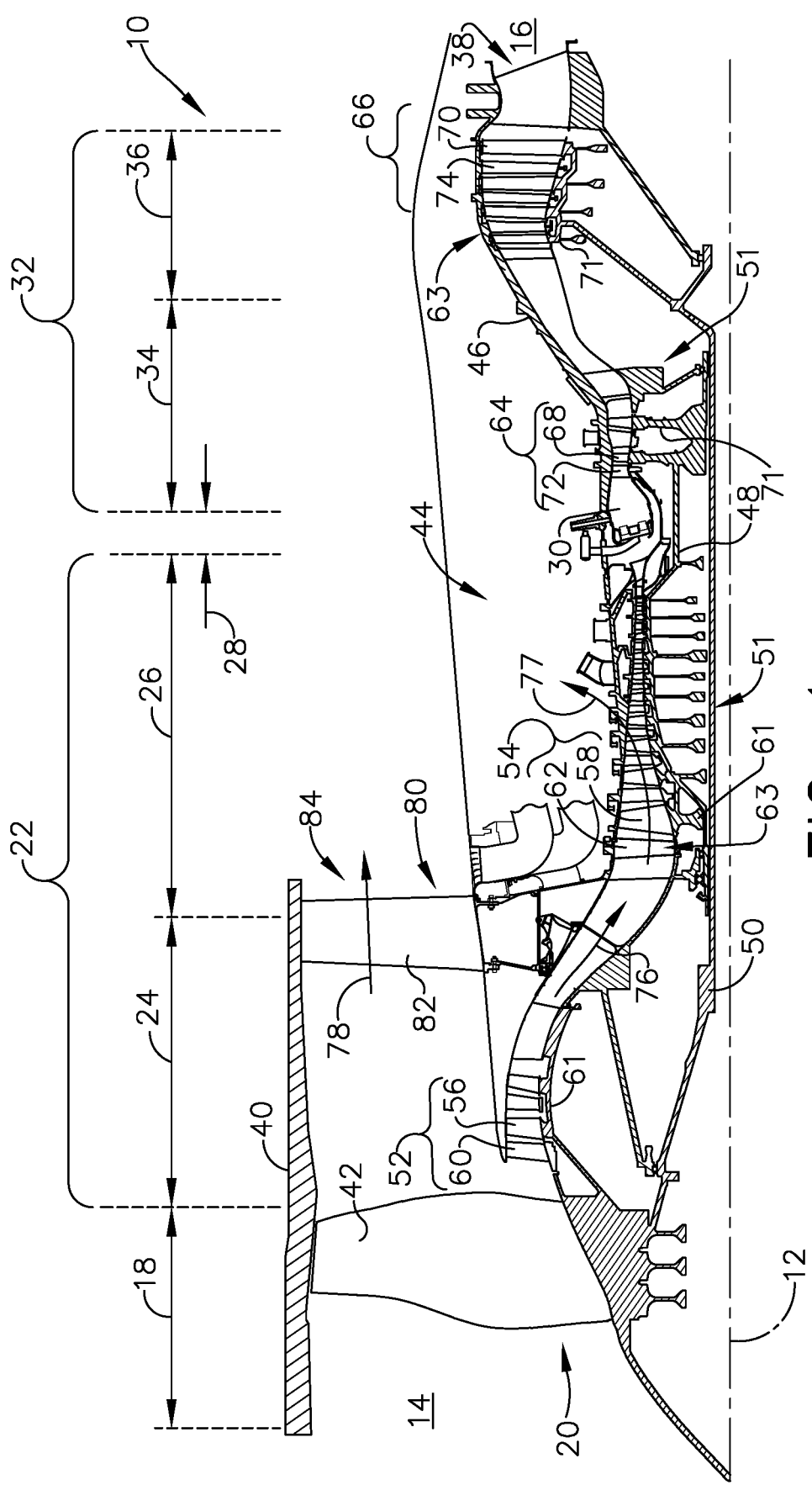
FIG. 1 is a schematic cross-sectional diagram of a turbine engine for an aircraft.

Aspects of the disclosure described herein are directed to the formation of at least one set of cooling holes having an inlet fluidly coupled to the cooling passage, an outlet located on one of the pressure side or suction side, with a connecting passage having a curvilinear centerline fluidly coupling the inlet to the outlet, and the connecting passage having a portion extending along the other of the pressure side or suction side. For purposes of illustration, the present disclosure will be described with respect to the turbine for an aircraft gas turbine engine. It will be understood, however, that aspects of the disclosure described herein are not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine sections 22, 32 are also referred to individually or collectively as a stator 63. As such, the stator 63 can refer to the combination of non-rotating elements throughout the engine 10.

In operation, the airflow exiting the fan section 18 is split such that a portion of the airflow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the engine assembly 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
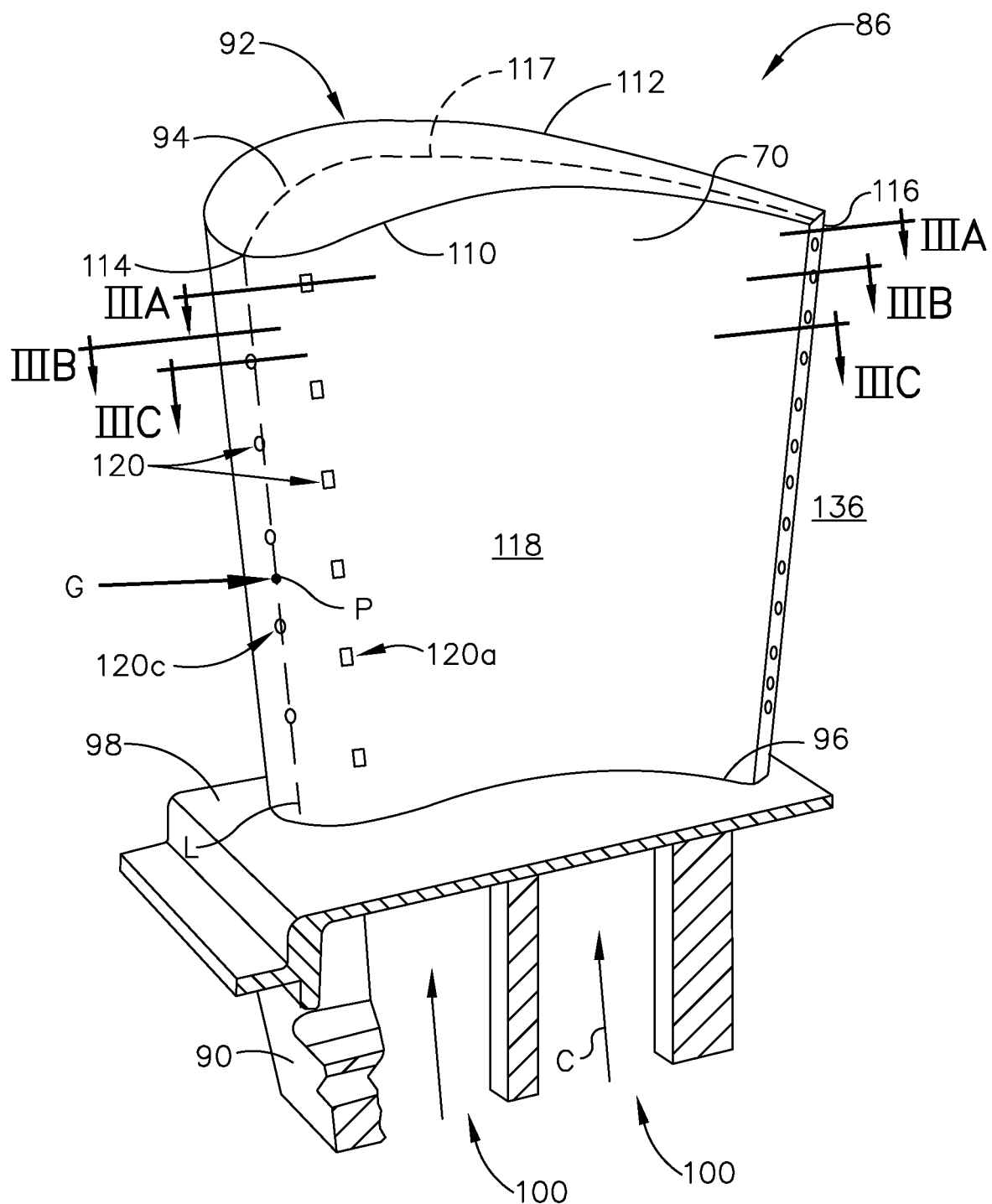
FIG. 2 is a perspective view of a turbine blade for the turbine engine from FIG. 1 including at least one set of cooling holes according to an aspect of the disclosure herein.

FIG. 2 is a perspective view of a turbine blade assembly 86 with an engine component in particular a turbine blade 70 of the engine 10 from FIG. 1. Alternatively, the engine component can include a vane, a strut, a service tube, a shroud, or a combustion liner in non-limiting examples, or any other engine component that can require or utilize cooling passages.

The turbine blade assembly 86 includes a dovetail 90 and an airfoil 92. The airfoil 92 extends between a tip 94 and a root 96 to define a span-wise direction. The airfoil 92 mounts to the dovetail 90 on a platform 98 at the root 96. The platform 98 helps to radially contain the turbine engine mainstream air flow. The dovetail 90 can be configured to mount to the turbine rotor disk 71 on the engine 10. The dovetail 90 further includes at least one inlet passage 100, exemplarily shown as two inlet passages 100, each extending through the dovetail 90 to provide internal fluid communication with the airfoil 92. It should be appreciated that the dovetail 90 is shown in cross-section, such that the inlet passages 100 are housed within the body of the dovetail 90.

The airfoil 92 includes a concave-shaped pressure side 110 and a convex-shaped suction side 112 which are joined together to define an airfoil shape extending between a leading edge 114 and a trailing edge 116 to define a chord-wise direction. Extending along a collection of center points in the chord-wise direction between the pressure side 110 and suction side 112 is the camber line 117 of the airfoil 92. The airfoil 92 is bound by an outer wall 118 and defined by the pressure and suction sides 110, 112. At least one set of cooling holes 120 can be located along any portion of the outer wall 118 including proximate the leading edge 114 on the pressure side 110. The at least one set of cooling holes 120, can be multiple sets of cooling holes 120a, 120b (FIG. 3B), 120c.

In operation when a flow of combusted gases (G) contacts the airfoil 92 at an angle of ninety degrees, the velocity of the combusted gases (G) is zero at this stagnation point (P). The stagnation point (P) can vary a certain degree along the leading edge 114 extending from the root 96 to the tip 94. It is contemplated that the point at which a third set of cooling holes 120c is located is along a stagnation line (L) extending from the root 96 to the tip 94 connecting stagnation points (P). It is further contemplated that the stagnation line (L) intersects the camber line 117 at the leading edge. While this can occur, it should be understood that the stagnation line (L) does not always intersect the camber line 117.

Figure 3A:
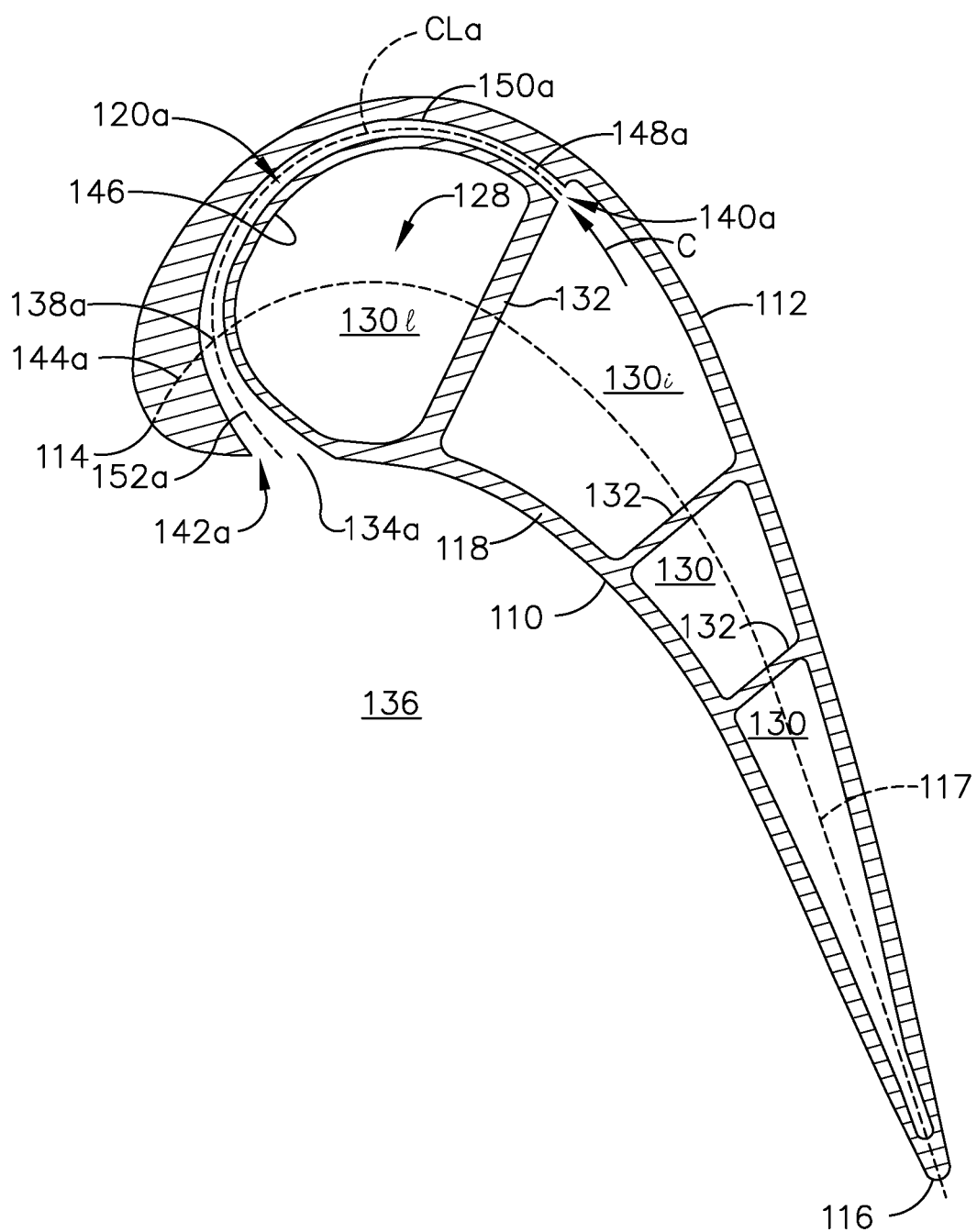
FIG. 3A is a sectional view of the turbine blade from FIG. 2 taken along line IIIA-IIIA.

Turning to FIG. 3A a cross-section of the airfoil 92 along line IIIA-IIIA shows an interior 128 bound by outer wall 118 including at least one set of cooling passages 130. The set of cooling passages 130 can be fluidly coupled with at least one of the inlet passages 100 (FIG. 2). The set of cooling passages 130 can be separated by interior walls 132. Interior walls 132 can extend between the pressure and suction sides as illustrated, and in other non-limiting examples can be any wall within the airfoil and defining at least a portion of the multiple cooling passages 130.

As illustrated, a first set of cooling holes 120a includes at least one cooling hole 134a extending between an interior 128 and an exterior 136 of the airfoil 92. The at least one cooling hole 134a includes a connecting passage 138a extending between a first inlet 140a located along the interior wall 132 and fluidly connected to an interior cooling passage 130i and a first outlet 142a located along the outer wall 118 on the pressure side 110 of the airfoil 92. The connecting passage 138a defines a curvilinear centerline CLa. While illustrated as fluidly connected to an interior cooling passage 130i, it is further contemplated that the at least one cooling hole 134a can be fluidly connected to a leading edge cooling passage 130l (FIG. 8A), or any other of the multiple cooling passages 130.

In an aspect of the disclosure herein, a thickened wall portion 144a local to the at least one cooling hole 134a on an interior surface 146 of the leading edge cooling passage 130l is formed in order to accommodate the full length of the at least one cooling hole 134a as it curves within the outer wall 118 at the leading edge 114. The thickened wall portion 144a can be provided anywhere along the interior surface 146. The thickened wall portion 144a can also be formed as a flow enhancer for flow going through cooling passage 130l. Pin fins, dimples, turbulators, or any other type of flow enhancer can also be provided along the interior surface 146. It should be understood that forming a flow enhancer, by way of non-limiting example a turbulator, can include forming the thickened wall portion 144a and the at least one cooling hole 134a passes through an interior of the turbulator.

The connecting passage 138a can include a metering section 148a having a circular cross section, though any cross-sectional shape is contemplated. The metering section 148a can be provided at or near the first inlet 140a. As illustrated, the metering section 148a defines the smallest cross-sectional area of the connecting passage 138a. It should be appreciated that more than one metering section 148a can be formed in the connecting passage 138a. The metering section 148a can extend from the first inlet 140a to a transition location 150a where the cross-sectional area of the connecting passage 138a begins to increase. It is contemplated that the cross-sectional area of the connecting passage 138a at the transition location 150a is coincident with the camber line 117, or on one or the other side of the camber line 117. By way of non-limiting example, the transition location 150a is located on the suction side 112 of the camber line 117.

A diffusing section 152a can be provided at or near the first outlet 142a to define a portion of the connecting passage 138a. In one exemplary implementation, the diffusing section 152a defines the first outlet 142a. The diffusing section 152a can have an increasing cross-sectional area extending toward the first outlet 142a from the transition location 150a. In one example, the cross-sectional area is continuously increasing as illustrated. In one alternative, non-limiting implementation, the increasing cross-sectional area can be a discontinuous or step-wise increasing cross-sectional area.

Figure 3B:
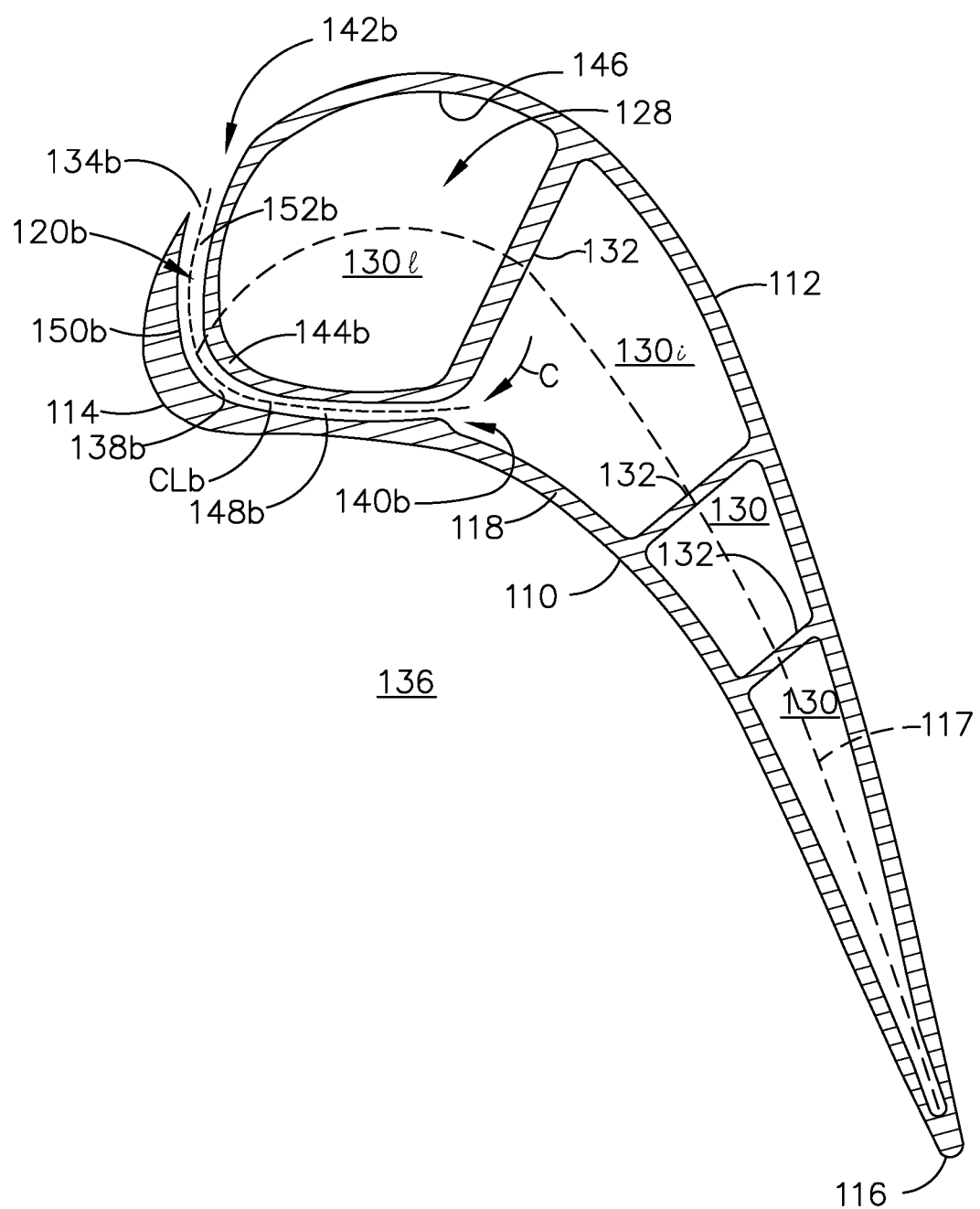
FIG. 3B is a sectional view of the turbine blade from FIG. 2 taken along line IIIB-IIIB.

Turning to FIG. 3B a cross-section of the airfoil 92 along line IIIB-IIIB shows a second set of cooling holes 120b located radially below the first set of cooling holes 120a with respect to airfoil 92. At least one cooling hole 134b extends between the interior 128 and the exterior 136 of the airfoil 92. The at least one cooling hole 134b includes a connecting passage 138b extending between a second inlet 140b located along the interior wall 132 and fluidly connected to an interior cooling passage 130i and a second outlet 142b located along the outer wall 118 on the suction side 112 of the airfoil 92. It is contemplated that either one of the first or second inlets 140a (FIG. 3A), 140b can be a bell shaped inlet as illustrated. The connecting passage 138b defines a curvilinear centerline CLb. While illustrated as fluidly connected to an interior cooling passage 130i, it is further contemplated that the at least one cooling hole 134b can be fluidly connected to a leading edge cooling passage 130l (FIG. 8B), or any other of the multiple cooling passages 130.

In an aspect of the disclosure herein, another thickened wall portion 144b, in the exemplary illustration below the thickened wall portion 144a (FIG. 3A), can be located along the interior surface 146 of the leading edge cooling passage 130l and formed in order to accommodate the full length of the at least one cooling hole 134b. The thickened wall portion 144b can be provided anywhere along the interior surface 146. The thickened wall portion 144b can be formed as a flow enhancer spaced from the thickened wall portion 144a in the span-wise direction.

The connecting passage 138b can include a metering section 148b having a circular cross section, though any cross-sectional shape is contemplated. The metering section 148b can be provided at or near the second inlet 140b. The metering section 148b can extend from the second inlet 140b to a transition location 150b where the cross-sectional area can begin to increase.

A diffusing section 152b can be provided at or near the second outlet 142b to define a portion of the connecting passage 138b. In one exemplary implementation, the diffusing section 152b defines the second outlet 142b. The diffusing section 152b can have an increasing cross-sectional area extending toward the second outlet 142b from the transition location 150b. In one example, the cross-sectional area is continuously increasing as illustrated. In one alternative, non-limiting implementation, the increasing cross-sectional area can be a discontinuous increasing cross-sectional area.

The connecting passages 138a, 138b connect the first and second inlets 140a, 140b to the first and second outlets 142a, 142b through which a cooling fluid (C) can flow. The metering sections 148a, 148b meter the mass flow rate of the cooling fluid (C). The diffusing sections 152a, 152b enable an expansion of the cooling fluid (C) to form a wider and slower cooling film along the outer wall 118. The diffusing sections 152a, 152b can be in serial flow communication with the metering sections 148a, 148b. It is alternatively contemplated that the at least one cooling holes 134a, 134b have minimal or no metering sections 148a, 148b, or that the diffusing sections 152a, 152b extend along the entirety of the at least one cooling holes 134a, 134b. Furthermore, the connecting passages 138a, 138b can have differing lengths or the same length depending on the location and function of the at least one cooling hole 134a, 134b to which the connecting passages 138a, 138b are associated. It can also be appreciated that the connecting passages 138a, 138b as described herein are fork shaped and terminate in multiple outlets, shingled or have multiple outlets stacked along the outer wall at various spacing.

It is further contemplated that only one of the first or second sets of cooling holes 120a, 120b have either one of the metering or diffusing sections as described herein or any combination of metering or diffusing sections. For example the first set of cooling holes 120a can include at least one cooling hole 134a with a diffusing section 152a extending along the entirety of the at least one cooling hole 134a while the second set of cooling holes 120b has both the metering section 148b and diffusing section 152b as described herein. It should be understood that the combination of diffusing and metering sections shown is for illustrative purposes only and not meant to be limiting.

Figure 3C:
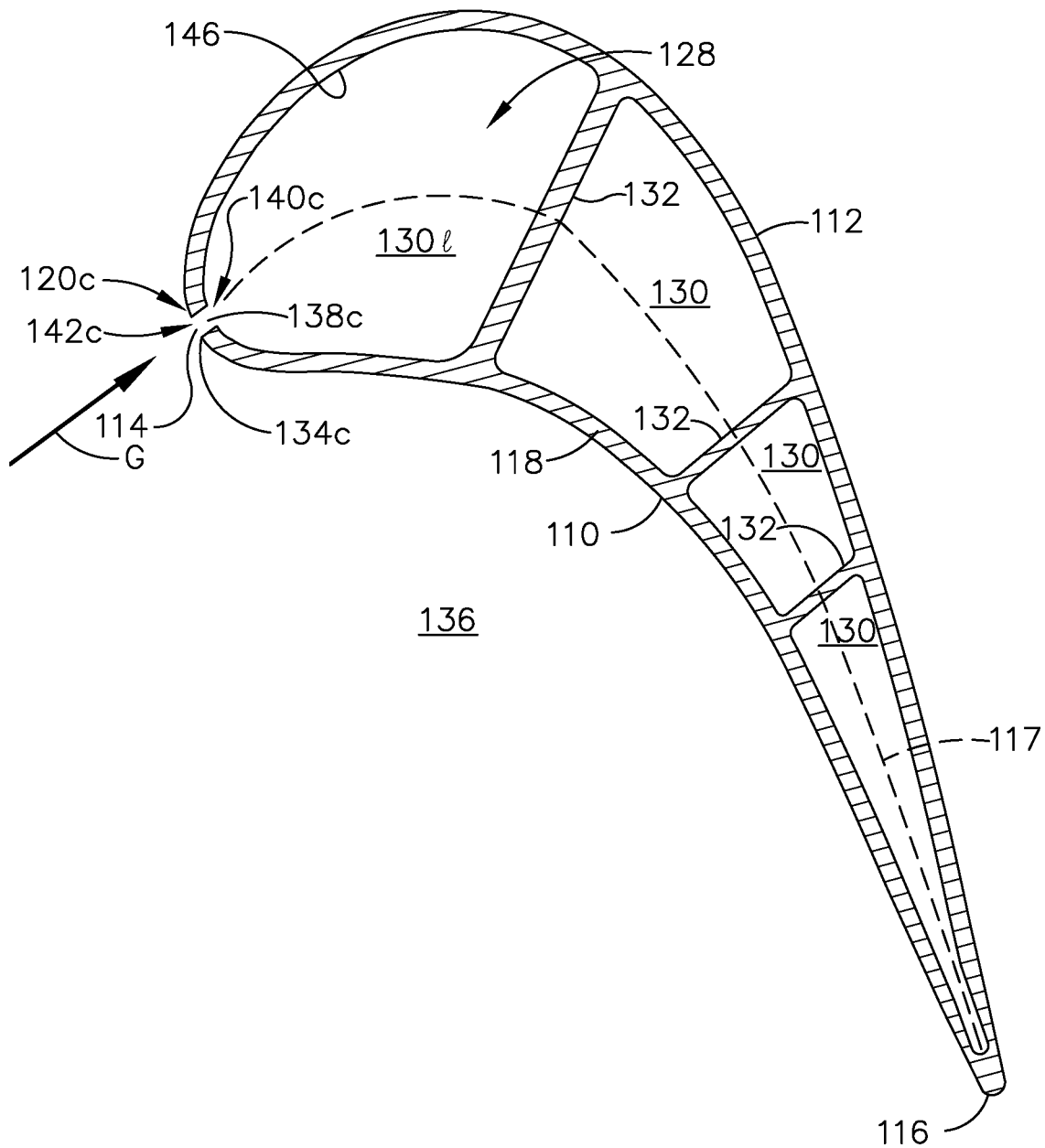
FIG. 3C is a sectional view of the turbine blade from FIG. 2 taken along line IIIC-IIIC.

Turning to FIG. 3C a cross-section of the airfoil 92 along line IIIC-IIIC shows the third set of cooling holes 120c located radially below the second set of cooling holes 120b with respect to airfoil 92. At least one stagnation cooling hole 134c extends between the interior 128 and the exterior 136 of the airfoil 92. The at least one stagnation cooling hole 134c extends between a third inlet 140c located along the interior surface 146 of the leading edge cooling passage 130l and a third outlet 142c located at the leading edge 114 along the outer wall 118 and intersecting with the stagnation line (L) illustrated in FIG. 2. It is contemplated that while the first and second sets of cooling holes 120a, 120b define curvilinear centerlines, the third set of cooling holes 120c is relatively straight extending through the outer wall 118 in the direction of the combustion gas flow (G) along the camber line 117. It is contemplated that the wall local to cooling hole 134c can be thickened to form a flow enhancer spaced from the thickened wall portion 144a and 144b in the span-wise direction.

It is contemplated that the cooling holes 134a, 134b, 134c as described herein can pass through a substrate, which by way of illustration is outer wall 118. It should be understood, however, that the substrate can be any wall within the engine 10 including but not limited to the interior walls 132, a tip wall, or a combustion liner wall. Materials used to form the substrate include, but are not limited to, steel, refractory metals such as titanium, or superalloys based on nickel, cobalt, or iron, and ceramic matrix composites. The superalloys can include those in equiaxed, directionally solidified, and crystal structures. The substrate can be formed by, in non-limiting examples, 3D printing, investment casting, or stamping.

As illustrated in FIG. 4A, the surface roughness along an interior surface 160 can have a smooth profile to enhance the flow of any cooling fluid through the connecting passage 138c. By way of non-limiting example, an enlarged view of the stagnation cooling hole 134c is illustrated, though it should be understood that, utilizing by way of non-limiting example additive manufacturing, a smooth interior surface 160 can be formed within any of the cooling holes 134a. 134b, 134c described herein.

As illustrated in FIG. 4B, a rough interior surface 162 has a jagged profile with high roughness for turbulating the flow of any cooling fluid through the connecting passage 138c. The rough interior surface 162 can have spiked or pointed points 163 irregularly arranged along the rough interior surface 162. Again, while an enlarged view of the stagnation cooling hole 134c is illustrated, it should be understood that, utilizing by way of non-limiting example additive manufacturing, a rough interior surface 162 can be formed within any of the cooling holes 134a. 134b, 134c described herein.

As illustrated in FIG. 4C, a shaped interior surface 164 has a patterned profile for controlled turbulation of the cooling fluid flow through the connecting passage 138c. The shaped interior surface 164 can include regularly spaced ridges 165. Again, while an enlarged view of the stagnation cooling hole 134c is illustrated, it should be understood that, utilizing by way of non-limiting example additive manufacturing, a patterned interior surface 164 can be formed within any of the cooling holes 134a, 134b, 134c described herein.

It is further contemplated that any combination of the interior surfaces 160, 162, 164 as described herein can be implemented in the cooling holes 134a, 134b, 134c as described herein.

FIG. 5A is a schematic representation of an arrangement of the first and second set of cooling holes 120a, 120b looking at the leading edge 114 of the airfoil 92 according to an aspect of the disclosure herein. It is contemplated that the transition locations 150a, 150b can line up with stagnation line (L) such that the diffusing section 152a is located primarily within the outer wall 118 along the pressure side 110 and diffusing section 152b is located primarily within the outer wall 118 along the suction side 112. It should be appreciated that in light of FIGS. 3A, 3B, and 3C, the first and second set of cooling holes 120a, 120b can form a crisscross pattern along the leading edge 114 when viewed along a sight line extending from the leading edge in the span-wise direction.

FIG. 5B is a schematic representation of an arrangement of the first and second set of cooling holes 120a, 120b looking at the leading edge 114 of the airfoil 92 according to another aspect of the disclosure herein. It is contemplated that the transition locations 150a, 150b are located on primarily one side or the other of stagnation line (L) such that the diffusing section 152a is located within the outer wall 118 first along the suction side 112 and then along the pressure side 110 and diffusing section 152b is located within the outer wall 118 first along the pressure side 110 and then along the suction side 112.

While illustrated as having alternating cooling holes 134a, 134b, it is contemplated that either one of the first set of cooling holes 120a or the second set of cooling holes 120b can include multiple cooling holes 134a, 134b defining a cooling fluid flow (C) in the same direction before alternating to the other of the first or second set of cooling holes 120a, 120b.

FIG. 6A illustrates an exemplary arrangement of the set of cooling holes 120. For clarity, the cooling holes themselves are not illustrated, instead arrows representing the cooling fluid flow (C) through each of the sets of cooling holes 120a, 120b is shown. The first set of cooling holes 120a can include multiple cooling holes 134a stacked in twos and alternating with the second set of cooling holes 120b having a single cooling hole 134b in the alternating pattern. A first portion of the cooling fluid flow (C1) can flow from along the suction side 112 and exhaust along the pressure side 110. A second portion of the cooling fluid flow (C2) can flow from along the pressure side 110 and exhaust along the suction side 112.

FIG. 6B illustrates an arrangement much like that of FIG. 6A, only now the second set of cooling holes 120b includes multiple cooling holes 134b stacked in twos and alternating with the first set of cooling holes 120a having a single cooling hole 134a in the alternating pattern.

FIG. 6C illustrates yet another an arrangement of the sets of cooling holes 120 much like FIG. 6A, only now the arrangement includes the third set of cooling holes 120c arranged along the stagnation line (L) and separating the first set of cooling holes 120a from the second set of cooling holes 120b.

While three arrangements of cooling holes extending along the leading edge 114 in the span-wise direction are illustrated, it should be understood that any combination or arrangement of the sets of cooling holes 120a, 120b, 120c as described herein is contemplated. It should be understood that any combination of the geometry related to the orientation of the sets of cooling holes with respect to each other and the leading edge 114 is also contemplated. In this manner the length of one of the cooling holes within a set can vary with respect to the length of another depending on the location and function of the cooling hole. The varying aspects of the disclosure discussed herein are for illustrative purposes and not meant to be limiting.

Furthermore, while the cooling hole arrangements are oriented in a substantially horizontal direction, it should be understood that the sets of cooling holes 120a, 120b, 120c as described herein can be arranged in an angled orientation with respect to the stagnation line (L). By way of non-limiting example, a first portion of the cooling fluid flow (C1) can be received through an inlet 140a at a radially inward location with respect to the location at which the first portion of the cooling fluid flow (C1) exits through an outlet 142a and vice versa. The arrangements are shown for illustrative purposes and not meant to be limiting.

Figure 7:
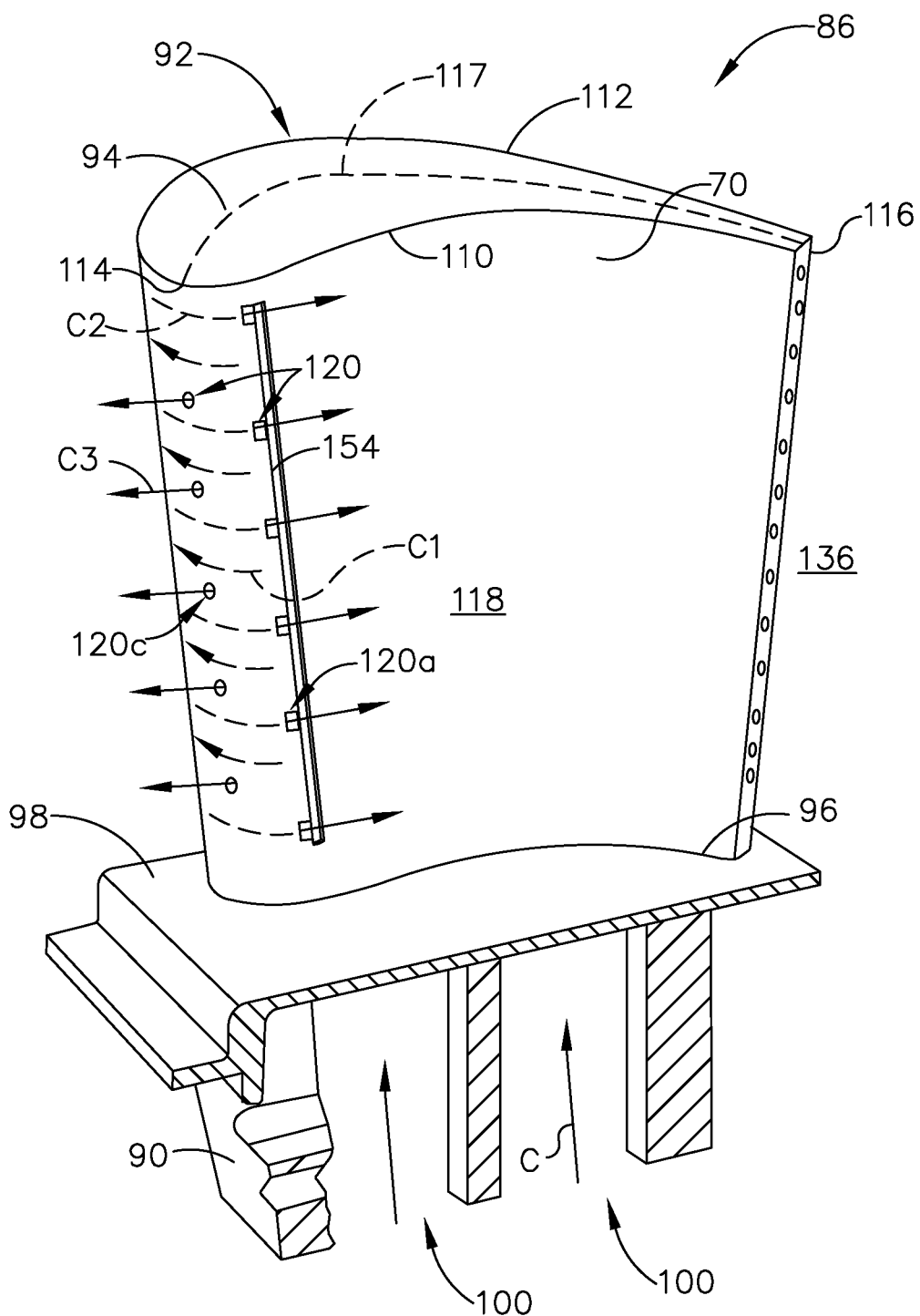
FIG. 7 is a perspective view of a turbine blade for the turbine engine from FIG. 1 including at least one set of cooling holes and a trench according to another aspect of the disclosure herein.

Turning to FIG. 7, a method of cooling the airfoil 92 as described herein can include flowing a cooling fluid (C) through at least one cooling hole 134a, 134b along one of the pressure or suction sides 110, 112, crossing the leading edge 114, and emitting the cooling fluid (C) through an outlet on the other of the pressure or suction side 110, 112. As is illustrated, a first portion of the cooling fluid (C1) passes through the first cooling hole 134a along the suction side 112, crosses the leading edge 114, and is emitted through the first outlet 142a. A second portion of the cooling fluid (C2) passes through the second cooling hole 134b along the pressure side 110, crosses the leading edge 114, and is emitted through the second outlet 142b (FIG. 3B). A third portion of the cooling fluid (C3) can flow through the stagnation cooling hole 134c and be emitted from the third outlet 142c.

In yet another aspect of the disclosure herein, as illustrated in FIG. 7, a trench 154 can extend along one of the pressure or suction sides 110, 112, by way of non-limiting example radially along the pressure side 110 as illustrated. The trench 154 can be coincident with the first set of cooling holes 120a as illustrated, or the second set of cooling holes 120b. The method as described herein can further include passing at least a portion of the cooling fluid (C) through the trench 154 in order to disperse the cooling fluid (C) along the outer wall 118.

As previously stated, the cooling fluid can be bypass air from the air supplied by the fan 20 (FIG. 1). Other sources of cooling fluid are also contemplated. It should also be understood that while cooling fluid (C) is supplied through the inlet passages 100, this is an exemplary inlet and is for illustrative purposes only and not meant to be limiting. By way of non-limiting example in the case of a stationary vane, the cooling fluid (C) can be fed into the airfoil 92 from above as well.

Figure 8A:
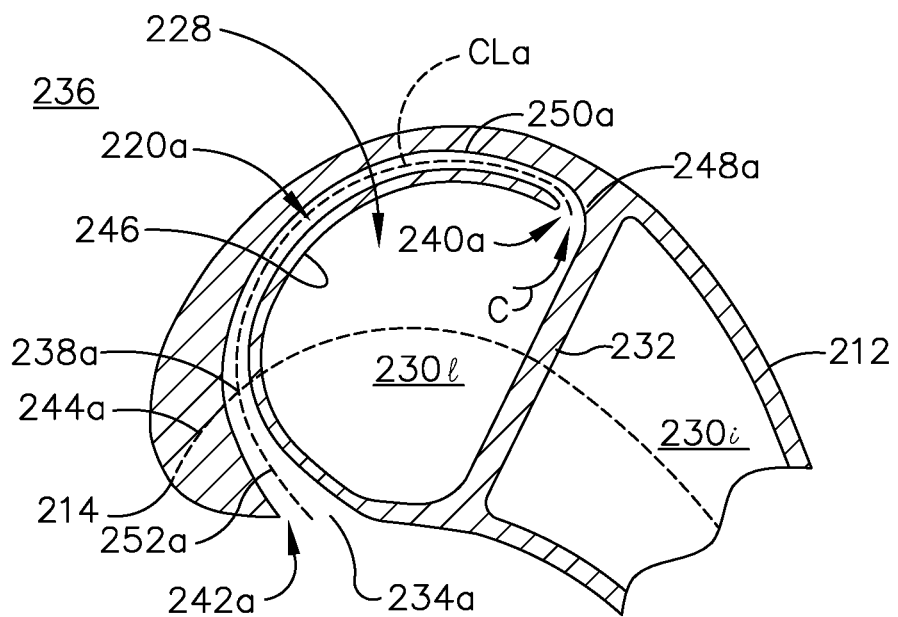
FIG. 8A is an enlarged view of a variation of the cross-section of FIG. 3A according to another aspect of the disclosure herein.

FIG. 8A is a set of cooling holes 220a according to another aspect of the disclosure discussed herein. The set of cooling holes 220a is substantially similar to the set of cooling holes 120a of FIG. 3A. Therefore, like parts will be identified with like numerals increased by 100, with it being understood that the description of the like parts of the set of cooling holes 120a applies to the set of cooling holes 220a unless otherwise noted.

The first set of cooling holes 220a includes at least one cooling hole 234a extending between an interior 228 and an exterior 236. The at least one cooling hole 234a includes a connecting passage 238a extending between a first inlet 240a located proximate an interior wall 232 and fluidly connected to a leading edge cooling passage 2301 and a first outlet 242a located along the outer wall 218 on a pressure side 210 of the airfoil 92. The connecting passage 238a defines a curvilinear centerline CLa.

Figure 8B:
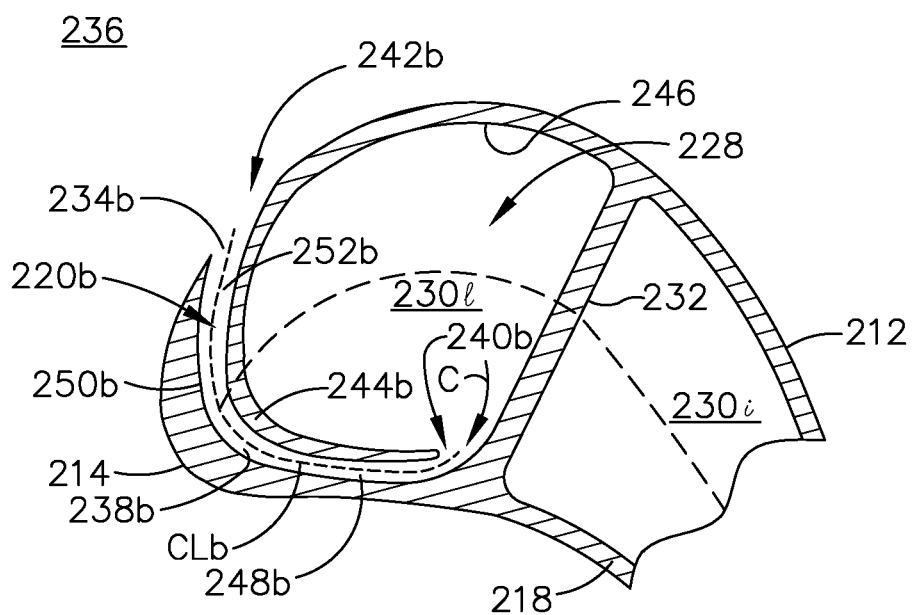
FIG. 8B is an enlarged view of a variation of the cross-section of FIG. 3B according to another aspect of the disclosure herein.

FIG. 8B is a set of cooling holes 220b according to another aspect of the disclosure discussed herein. The set of cooling holes 220b is substantially similar to the set of cooling holes 120b of FIG. 3B. Therefore, like parts will be identified with like numerals increased by 100, with it being understood that the description of the like parts of the set of cooling holes 120b applies to the set of cooling holes 220b unless otherwise noted.

Similar to the first set of cooling holes 220a, the second set of cooling holes 220b includes at least one cooling hole 234b including a connecting passage 238b extending between a second inlet 240b located proximate an interior wall 232 and fluidly connected to a leading edge cooling passage 1301 and a second outlet 242b located along the outer wall 118 on a suction side 212 of the airfoil 92. The connecting passage 238a defines a curvilinear centerline CLb.

Benefits associated with arrangement of the sets of cooling holes described herein are related to bore cooling as well as surface cooling. More specifically, lengthening the cooling holes within the outer wall provides convection cooling of the outer wall while the cooling fluid flows along the curvilinear centerline of the cooling holes as described herein. Exhausting the cooling fluid as describes herein provides cooling on both the pressure and suction sides. Arranging the sets of cooling holes as described herein is dependent on the location of the blade within the engine, therefore cooling can be focused along the pressure or suctions sides as required based on engine locale.

Additionally, crisscrossing the cooling holes with respect to the leading edge provides additional cooling to the leading edge. Providing the cooling fluid from a cooling passage other than the leading edge cooling passage also enhances the cooling along the leading edge.

Elongating the cooling fluid path reduces mixing losses and creates a more persistent film. Any increase in film performance enables less usage for cooling, by way of non-limiting example, high pressure turbine components which improves specific fuel consumption of the engine as a whole.

The sets of cooling holes as described herein can be manufactured utilizing additive manufacturing technologies or other advanced casing manufacturing technologies such as investment casting and 3-D printing. The technologies available provide cost benefits along with the other benefits described. It should be understood that other methods of forming the cooling circuits and cooling holes described herein are also contemplated and that the methods disclosed are for exemplary purposes only.

It should be appreciated that application of the disclosed design is not limited to turbine engines with fan and booster sections, but is applicable to turbojets and turbo engines as well.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine comprising:
an outer wall bounding an interior and defining a pressure side and an opposing suction side, with both sides extending between a leading edge and a trailing edge to define a chord-wise direction, and extending between a root and a tip to define a span-wise direction;
at least one cooling passage located within the interior;
a first set of cooling holes comprising at least one cooling hole having a first inlet fluidly coupled to the at least one cooling passage, a first outlet located on the pressure side, with a first connecting passage having a curvilinear centerline fluidly coupling the first inlet to the first outlet, and the first connecting passage having a portion extending along the suction side;
a second set of cooling holes comprising at least one cooling hole having a second inlet fluidly coupled to the at least one cooling passage, a second outlet located on the suction side, with a second connecting passage having a curvilinear centerline fluidly coupling the second inlet to the second outlet, and the second connecting passage having a portion extending along the pressure side; and
a third set of cooling holes comprising at least one cooling hole having a third inlet fluidly coupled to the at least one cooling passage, a third outlet located proximate the leading edge of the outer wall in between the first outlet and the second outlet, with a third connecting passage radially spaced from the first and second connecting passages and having a straight centerline fluidly coupling the third inlet to the third outlet.

2. The airfoil of claim 1 wherein the at least one cooling passage includes a leading edge cooling passage and an interior cooling passage separated by an interior wall and the first and second inlets are located along the interior wall fluidly coupled to the interior cooling passage, and the third inlet is fluidly coupled to the leading edge cooling passage.

3. The airfoil of claim 1 wherein at least one of the first, the second, or the third sets of cooling holes further comprises an interior surface having one of a smooth, jagged, or patterned profile.

4. The airfoil of claim 1 wherein the at least one cooling passage is a leading edge cooling passage, where the first, second, and third inlets are fluidly coupled to the leading edge cooling passage.

5. The airfoil of claim 1 wherein at least some of the first and second connecting passages include a transition location from which a diffusing section extends.

6. The airfoil of claim 5 wherein the transition location is located interiorly of the leading edge and is coincident with a camber line of the airfoil.

7. The airfoil of claim 5 wherein the transition location is located interiorly of one of the pressure or suction sides.

8. The airfoil of claim 1 further comprising a trench extending along one of the pressure or suction sides and located coincident with the first outlet on the pressure side or the second outlet on the suction side.

9. The airfoil of claim 1 wherein the at least one cooling passage further comprises a thickened wall portion and at least one of the first connecting passage or the second connecting passage passes through the thickened wall portion.

10. The airfoil of claim 9 wherein the thickened wall portion is formed to accommodate a full length of the first or the second set of cooling holes as it curves within the outer wall.

11. The airfoil of claim 10 wherein the thickened wall portion is a turbulator.

12. The airfoil of claim 1 wherein the first and second set of cooling holes forming a crisscross pattern when viewed along a sight line extending from the leading edge in the span-wise direction.

13. The airfoil of claim 1 wherein the first set of cooling holes alternates in location with respect to the second set of cooling holes with respect to the span-wise direction.

14. An engine component for a turbine engine comprising:
- an outer wall bounding an interior and defining a pressure side and an opposing suction side, with both sides extending between a leading edge and a trailing edge to define a chord-wise direction, and extending between a root and a tip to define a span-wise direction;
- at least one cooling passage located within the interior;
- a first set of cooling holes comprising at least one cooling hole having a first inlet fluidly coupled to the at least one cooling passage, a first outlet located on the pressure side, with a first connecting passage having a curvilinear centerline fluidly coupling the inlet to the outlet, and the first connecting passage having a portion extending along the suction side;
- a second set of cooling holes comprising at least one cooling hole having a second inlet fluidly coupled to the at least one cooling passage, a second outlet located on the suction side, with a second connecting passage having a curvilinear centerline fluidly coupling the second inlet to the second outlet, and the second connecting passage having a portion extending along the pressure side; and
- a third set of cooling holes comprising at least one cooling hole having a third inlet fluidly coupled to the at least one cooling passage, a third outlet located proximate the leading edge of the outer wall in between the first outlet and the second outlet, with a third connecting passage radially spaced from the first and second connecting passages and having a straight centerline fluidly coupling the third inlet to the third outlet.

15. The engine component of claim 14 wherein at least one of the first, the second, or the third sets of cooling holes further comprises an interior surface having one of a smooth, jagged, or patterned profile.

16. The engine component of claim 14 further comprising a trench extending along one of the pressure or suction sides and located coincident the first outlet on the pressure side or the second outlet on the suction side.

17. The engine component of claim 14 wherein the at least one cooling passage further comprises a thickened wall portion and at least one of the first connecting passage or the second connecting passage passes through the thickened wall portion.

18. The engine component of claim 14 wherein the first and second set of cooling holes forms a crisscross pattern when viewed along a sight line extending from the leading edge in the span-wise direction.

19. The engine component of claim 14 wherein the first set of cooling holes alternates in location with respect to the second set of cooling holes with respect to the span-wise direction.

* * * * *